United States Patent
Li et al.

(10) Patent No.: US 8,254,694 B2
(45) Date of Patent: *Aug. 28, 2012

(54) THIN LINE DETECTION IN SCANNED IMAGE DATA

(75) Inventors: Xing Li, Webster, NY (US); Ryan Metcalfe, Marion, NY (US); Peter McCandlish, Rochester, NY (US); Barbara Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 713 days.

This patent is subject to a terminal disclaimer.

(21) Appl. No.: 12/480,229

(22) Filed: Jun. 8, 2009

(65) Prior Publication Data

US 2010/0310170 A1    Dec. 9, 2010

(51) Int. Cl.
*G06K 9/56* (2006.01)

(52) U.S. Cl. ......... 382/205; 382/224; 382/270; 382/266

(58) Field of Classification Search .................. None
See application file for complete search history.

(56) References Cited

U.S. PATENT DOCUMENTS

| | | | |
|---|---|---|---|
| 4,468,704 A * | 8/1984 | Stoffel et al. | 358/464 |
| 5,539,534 A | 7/1996 | Hino et al. | |
| 5,583,659 A * | 12/1996 | Lee et al. | 358/3.13 |
| 5,586,200 A | 12/1996 | Devaney et al. | |
| 6,178,260 B1 | 1/2001 | Li et al. | |
| 6,347,153 B1 | 2/2002 | Triplett et al. | |
| 6,707,953 B1 | 3/2004 | Iida | |
| 6,941,014 B2 | 9/2005 | Lin et al. | |
| 7,280,253 B2 | 10/2007 | Li | |
| 7,463,785 B2 | 12/2008 | Ebisawa | |

* cited by examiner

*Primary Examiner* — Jason M Repko
*Assistant Examiner* — Siamak Harandi
(74) *Attorney, Agent, or Firm* — Pillsbury Winthrop Shaw Pittman LLP

(57) ABSTRACT

Disclosed herein is a method for detecting thin lines in image data. The method is performed by a processor to process contone image data. The processing includes thresholding a window of pixels established in the contone domain to generate a binary window of image data, and then determining characteristics associated with on pixels or runs of the binary data. The characteristics (start and end locations, length of on runs) are then thresholded. The processing in the contone and binary domain are used to determine if a thin line exists in the window of image data. The disclosed method produces better quality output images and reduces the addition of false lines in an image.

23 Claims, 8 Drawing Sheets

NOTE: QUALITY OF FIGURE IS LOW ON PURPOSE

NOTE: QUALITY OF FIGURE IS LOW ON PURPOSE

THIN LINE DETECTION IN SCANNED IMAGE DATA

BACKGROUND

1. Field

The present disclosure is generally related to detecting thin lines in image data.

2. Description of Related Art

Image data comprises a number of pixels, each pixel corresponding to a defined location in the image. The pixels may have a number of components that contribute to defining the image, such as color and intensity. Binary image data has two possible values for each pixel, black (represented by the number "1") or white (represented by the number "0"). Binary images may also be represented as pixels that are "on" or "off" in color images where pixels are represented by color planes. Images that have a large range of shades are referred to as grayscale image. For example, grayscale images have an 8-bit value (or higher) per pixel comprising 256 tones or shades of gray for each pixel in the image (gray level of 0 to 255). Grayscale image data may also be referred to as continuous tone or contone image data.

A technique for manipulating image data for output includes segmentation (or auto-segmentation). Generally, auto-segmentation techniques are known, and are used to select the most appropriate method to render the various object types (e.g., black and white or color images, text, photos, etc.) present in an image. In some segmentation techniques, separation modules are used to detect and separate text from objects of image data (e.g., photographs or other pictorial parts) so that text image data may be compressed and/or processed differently as compared to the object image data. Image segmentation plays an important role in delivering image quality for copy and scan services. While the technology for image segmentation has been improving over the years, some current methods in use still have limitations in a number of areas—the robustness in thin line detection being one of them. Sometimes, when robust separation of image and text/line art is needed, some kind of two-pass operation, such as auto-windowing, is used. These solutions, however, may not be suitable for all situations due to the cost and complexity associated with them. Also, such methods may not necessarily produce high quality images, as the detection of thin lines may be scarce or eliminated, thus reducing the output quality of the image data. Furthermore, known segmentation methods are sometimes incapable of accurately distinguishing edges from halftone dots or lines.

Therefore, a simpler, yet effective method for manipulating image data for output and for determining thin lines in input image data is desirable.

SUMMARY

One aspect of the disclosure provides a method for detecting thin lines in image data. The method includes: receiving contone image data via an input device, the image data including a plurality of pixels; and using a processor to process the image data and determine the presence of thin lines. The processing includes: establishing a window including a pixel of interest and neighboring pixels; determining a minimum value and a maximum value in a selected subset of pixels in the window; thresholding the pixel of interest and neighboring pixels of the window using thresholds; converting the pixels in the window, after thresholding, into a binary window of image data including a plurality of binary pixels, the binary pixels including a number of on and off pixels; determining characteristics associated with the on pixels in each row and column of the binary window; thresholding the characteristics associated with the on pixels and off pixels of the binary window; determining if a thin line exists in the window based on the thresholding of the characteristics associated with the on pixels and off pixels; and classifying the pixel of interest as an edge pixel that is part of a thin line if it is determined that the thin line exists.

Another aspect of the disclosure provides a system for detecting thin lines in image data. The system includes an input device for receiving contone image data, the image data including a plurality of pixels; and a processor configured to process the image data and determine the presence of thin lines. The processor includes a thin-line detection module having code executable by the processor for performing a method comprising: establishing a window including a pixel of interest and neighboring pixels; determining a minimum value and a maximum value in a selected subset of pixels in the window; thresholding the pixel of interest and neighboring pixels of the window using thresholds; converting the pixels in the window, after thresholding, into a binary window of image data including a plurality of binary pixels, the binary pixels including a number of on and off pixels; determining characteristics associated with the on pixels in each row and column of the binary window; thresholding the characteristics associated with the on pixels and off pixels of the binary window; determining if a thin line exists in the window based on the thresholding of the characteristics associated with the on pixels and off pixels; and classifying the pixel of interest as an edge pixel that is part of a thin line if it is determined that the thin line exists.

Yet another aspect of the disclosure provides a computer program product including: a computer-usable data carrier storing instructions that, when executed by a computer, cause the computer to perform a method including: establishing a window having a pixel of interest and neighboring pixels; determining a minimum value and a maximum value in a selected subset of pixels in the window; thresholding the pixel of interest and neighboring pixels of the window using thresholds; converting the pixels in the window, after thresholding, into a binary window of image data including a plurality of binary pixels, the binary pixels including a number of on and off pixels; determining characteristics associated with the on pixels in each row and column of the binary window; thresholding the characteristics associated with the on pixels and off pixels of the binary window; determining if a thin line exists in the window based on the thresholding of the characteristics associated with the on pixels and off pixels; and classifying the pixel of interest as an edge pixel that is part of a thin line if it is determined that the thin line exists.

Other features and advantages of the present disclosure will become apparent from the following detailed description, the accompanying drawings, and the appended claims.

DETAILED DESCRIPTION

Figure 1:
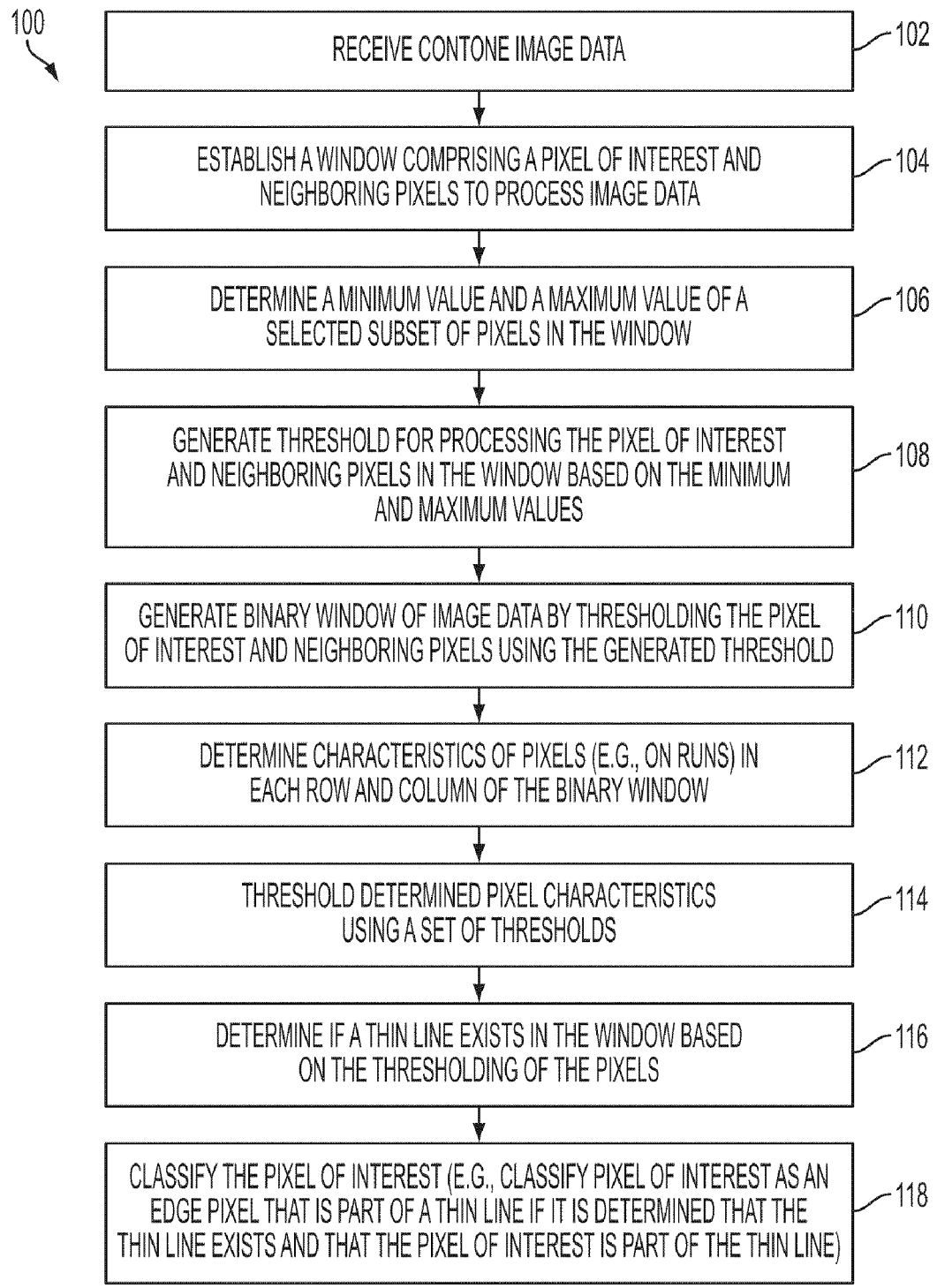
FIG. 1 illustrates a method for detecting thin lines in image data in accordance with an embodiment of the present disclosure.

This disclosure proposes a single-pass thin line detection algorithm with improved robustness for image data. As will become further evident in throughout the specification, a "thin line" is defined as pixels of similar value in image data that are provided in a sequence adjacent each other. More specifically, a regular edge or line in an image is defined in this disclosure as having multiple (e.g., more than 2) pixels wide. In some cases, the regular or thicker lines in an image may have pixels approaching a blackpoint minimum of the imaging or scanning device at its darkest point. In an embodiment, it is envisioned that a thin line is defined as comprising fractions that are 1 to 4 pixels (i.e., less than 4 pixels) wide and may be lighter than a regular line. A thin line, therefore—for explanatory purposes in this disclosure—is defined as comprising fractions of a number of pixels wide that are smaller than thicker lines, and, in some cases, may also comprise pixels that are lighter than pixels in a thicker line. The parameters for defining a thin line may be altered or set such that somewhat thicker lines may also be detected. For example, the parameters for a thin line may be set based on the types of lines (and number of pixels wide the lines are) present in the image data, based on the minimum types of points (e.g., such as when pixels are significantly lighter than a minimum point), based on light or dark values of pixels in image data, or based on factors in the type of image data that is generally input. As such, the definition for a thin line should not be limiting.

The proposed method uses adaptive thresholding to generate binary image data in order to analyze the locations, the number and the sizes of on runs in each row and column. "On" runs, as will become further evident, are defined as a sequence of pixels that are on in a window, such as after binarization. It also determines the variation from row to row and from column to column of a window being processed. It combines features extracted from the contone domain with the thresholding in the binary domain in making the detection decision that a pixel of interest is part of a thin line. The pixel of interest may be classified as an "edge" pixel or a "non-edge" pixel, such as by tagging the pixel. An "edge" pixel is a pixel in image data that is part of a line in the image data; a "non-edge" pixel is a pixel of image data that is not part of a line in the image data.

Throughout this disclosure the terms "on" and "off" are used with reference to describing pixels of image data in the binary domain. When referring to image data, the values associated with on and off may be determined by the state of processing the image data. For example, when image data is being manipulated or segmented, an on pixel may be defined as a pixel with a value of "0." Alternatively, in other embodiments, such as when image data is converted for output on a printer or machine, on pixels are recognized by a value of "1" (e.g., indicating presence of color or gray level for the printer to distribute ink). For purposes of the embodiments described herein, on pixels will be identified as pixels with a value of "0" (zero), and off pixels will be identified as pixels with a value of "1" (one) during processing. However, the term "on" and its value should not be limited.

The method/algorithm described below includes a plurality of steps (e.g., processor-implemented) as well as a number of variable thresholds. It is to be understood by one in the art that such thresholds and other variables may be programmable parameters, predetermined parameters, or parameters that are determined based on the input image data, and should not be limiting. Further description regarding the variable and/or adaptive thresholds is provided below. The following describes an example of an embodiment.

Figure 2:
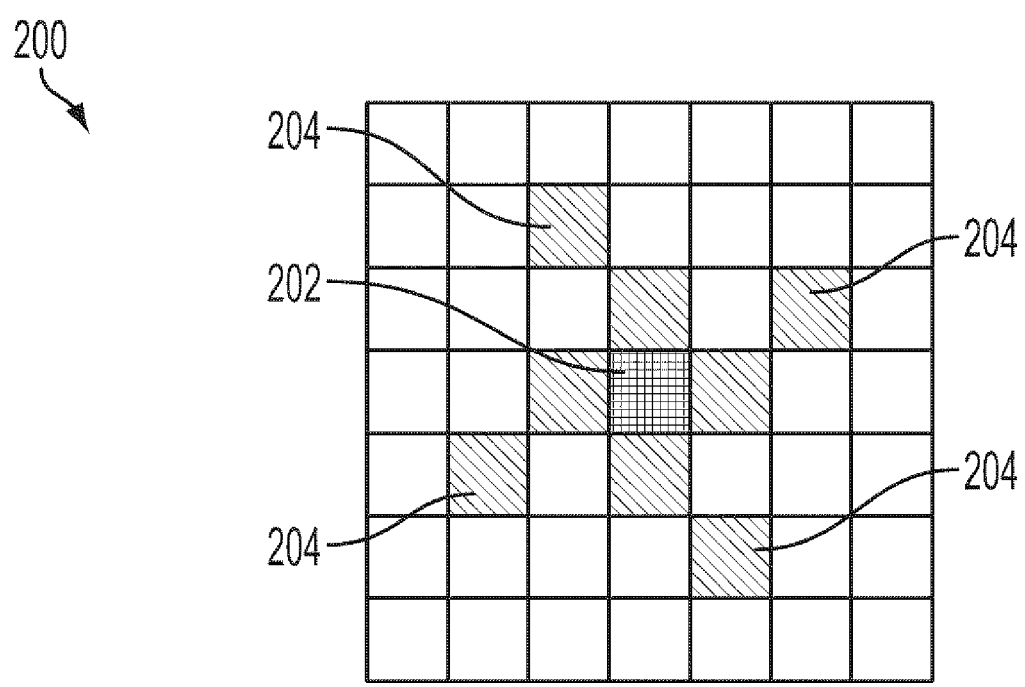
FIG. 2 illustrates an example of window used to process image data in accordance with an embodiment of the present disclosure.

FIG. 1 illustrates a method 100 for detecting a thin line in image data in accordance with an embodiment of the present disclosure. The method 100 begins when contone image data is received in step 102 via an input device. The input image data comprises a plurality of pixels of the contone domain. The image data is then processed using a processor (such as processing module 404 shown in FIG. 4) to determine the presence of thin lines. In particular, this disclosure describes an algorithm that uses a matrix to determine minimum and maximum values of pixels of image data, thresholds, and the like to thereby process the input image data in both contone and binary domains and provide better output image quality. In an embodiment, the matrix may be viewed as a "window" that slides across and down an input image. An example of such a window is illustrated in FIG. 2, represented by element 200. As shown the window 200 may comprise a pixel of interest 202, i.e., the center pixel, that is to be processed/classified based on its neighboring pixels 204 in the window 200, for example. Though a matrix or window of 7×7 is used herein as an example, matrices or windows of other sizes are also within the scope of this disclosure.

As shown in FIG. 1, after receiving the contone image data in step 102, a window such as window 200 is established in step 104 by the processor. In some cases, such a window may be established by a run-length thin line detection module 414 that is part of the processor 404, as shown in FIG. 4. The window 200 comprises the pixel of interest 202 (i.e., a center pixel) and neighboring pixels. The window 200 is used for processing the pixels in the binary domain to determine the existence of a line. For example, as shown and described with reference to FIG. 3, after thresholding the pixels, a window 300 comprises a plurality of on and off pixels (e.g., pixels having values of "0" or "1"). These values, in particular the on or "0" pixels may produce a series of on runs which are used for analyzing the pixel of interest 202, further described below.

Referring back to FIG. 1, a minimum value and a maximum value in a selected subset of pixels in the window 200 is determined in step 106 using a min-max module or the thin line detection module 414 (e.g., which may include a min-max module), for example, after a window is established in step 104. That is, in the illustrated 7×7 window, there are 49 pixels provided for processing. A representative subset of pixels is chosen to determine a minimum value and a maximum value that are representative of the values in the window. The subset is chosen based on a possible location of a thin line. For example, a plurality of pre-determined locations or a pattern of pixels in the window 200 may be determined as the subset based on the expectation that, if the pixel of interest is on a thin line, then some of the pixels in the selected subset will have lower values and some will have higher values. In some cases, the subset of pixels may comprise a plurality of darker/black pixel values and a plurality of lighter/white pixel values therein. For example, if the pixel of interest is on a thin line, pixels of varying gray levels are expected in the subset. In some embodiments, the selected subset of pixels includes a plurality of pixels in or adjacent a center region of the window. For example, a pattern of pixels in the center area may be selected while pixels along an outer perimeter are eliminated. Alternatively, in a possible embodiment, the selected subset of pixels may comprise a plurality of pixels from window 200 that are selected at random.

FIG. 2 highlights an example embodiment showing the subset of pixels 204 used in minimum and maximum value calculation. The center pixel is identified as the pixel of interest 202. A plurality of pixels 204 in the window 200 are used to determine the minimum and maximum the subset. The subset of pixels 204 comprises a plurality of selected pixels in predetermined locations of interest (with respect to the thin line). This subset may include some of the darker pixels (i.e., lower value pixels) and some of the lighter/whiter pixels (i.e., higher value pixels) in the selected window 200. Of course, other ways of implementation are possible and within the scope of this disclosure.

Once the minimum and maximum values of the selected subset are determined in step 106, the processor determines whether the following conditions are satisfied using the following formulas:

$$\text{maxOf9} - \text{minOf9} > \text{dif9} \quad (1)$$

$$\text{maxOf9} > \text{high5} \times 5 \quad (2)$$

Where:
maxOf9 is the maximum value of the subset of pixels 204 highlighted in FIG. 2;
minOf9 is the minimum value of the subset of pixels 204 highlighted in FIG. 2;
dif9 is a value representing a predetermined difference; and
high5×5 is a value representing the background (white) pixels.

That is, the processor determines: a) if the difference between the minimum and maximum values is greater than a predetermined difference, and b) if the maximum value of the subset is greater than a highest value. The comparison of the difference between the minimum and maximum values to the predetermined difference dif9 in condition (1) is performed to ensure that there is a possibility of a thin line within the window. For example, if the difference between the maxOf9 and minOf9 is a smaller value (i.e., the minimum and maximum values of the subset of pixels are close to each other) that is not greater than the predetermined difference dif9, it is determined that a thin line most likely does not exist in the thin window currently being processed. Therefore, for condition (1), one would generally expect the difference between the minimum and maximum values to be a high value that is greater than a predetermined value. For example, a value for the background (e.g., paper) may be a high value (e.g., 255), whereas a value for one or more pixels indicating the presence of a thin line may be a lower value (e.g., 30). This high value, therefore, would be greater than the predetermined difference dif9.

The highest value high5×5 is used to identify the background, i.e., white, pixels in the subset of pixels. Condition (2) verifies that the pixels being processed are provided on a background of white, or a value close to white. Condition (2) compares the maximum value maxOf9 to the highest value high5×5. It is generally expected that the highest value high5×5 will be approximately as high as the paper white value, and may be any value that represents the highest value of white (in the window). Thus, in order to ensure that the pixels are provided on a background of white, the maximum value maxOf9 must be higher that the highest value high5×5. The highest value high5×5 is chosen based on a threshold value where one might expect paper to register in value (e.g., 0 to 255). For example, if paper registers at a value of 253, 254, or 255, highest value high5×5 may be set at a threshold of 252, so that when compared to the maximum maxOf9, one is ensured that the possible thin line is on a white background.

In some cases, the highest value high5×5 may be the same value as the maximum value maxOf9. Thus, the maximum value maxOf9 and highest value high5×5 are equal. In an embodiment as noted above, condition (2) is not met, and the pixel of interest is not determined to be a part of the thin line (and so, a new pixel of interest may be chosen). However, it is envisioned in possible embodiments that condition (2) may be defined as maxOf9>=high5×5. In this case, an equal condition (i.e., maxOf9=high5×5) would satisfy condition (2) and thus further algorithm processing would be performed. Though a more satisfactory value for high5×5 would most likely be greater than maxOf9 by at least one gray level value, either determination may be used. More specifically, in some cases, threshold value(s) may be set accordingly to achieve the effect of maxOf9 being greater than threshold(s).

The difference dif9 and highest value high5×5 may be chosen based on what one would normally expect in a window having a thin line and background paper values. That is, the steps used in the method, or that are implemented by the system, may be a "smart" method or system, defined by its capability to use rules and logic to determine if the pixels/values are associated with a line or a background, and/or the like. In an example embodiment, the predetermined difference dif9 and the highest value high5×5 are each values that are pre-programmed and/or chosen based on experience (e.g., such as historical data). For example, one may anticipate ranges or values that are associated with darker/black pixels, as well as ranges or values that are associated with lighter/white pixels. Alternatively, in an embodiment, it is envisioned that the method (or system) may adapt to the image data that is received as input image data to determine the ranges or values that are associated with determining that the conditions are met. Any of these associations or anticipations may be used to assist in choosing the variables dif9 and high5×5. However, the methods or strategies for choosing such values for comparison in conditions (1) and/or (2) should not be limiting.

If conditions (1) and (2) are both met, the processing of the image data continues as described with reference to FIG. 1. However, if conditions (1) and (2) are not met, processing of the image data does not continue. Rather, a new window is established (i.e., the window is traversed or moved across or down the image data), and the subset, minimum and maximum values, and conditions are evaluated for the new window with a new pixel of interest and its neighboring pixels. Each window is processed by determining these values and that these conditions (1) and (2) are met. By determining the minimum and maximum values based on a subset of pixels in each window, the present disclosure is capable of using variable or adaptive values when processing the image data. More specifically, when conditions (1) and (2) are satisfied, the minimum and maximum values of a window may be used to generate adaptive thresholds for further processing of the image data.

After step 106 and satisfying the conditions (1) and (2) associated therewith, the processor is then used in step 108 to determine or generate a threshold for processing the pixel of interest and neighboring pixels in the window based on the minimum and maximum values. Thresholding the pixels in the window generates a window of pixels in a binary domain, i.e., comprising on and off pixels. For example, the processor uses the following formula:

$$binThreshold = (maxOf9 + minOf9) >> 1 + thresholdOffset$$

Where:

binThreshold is a value for thresholding the pixels in the window thresholdOffset is an offset value That is, the processor generates a binThreshold for processing the pixels in the window. Specifically, this formula determines the binThreshold calculating an average of the maximum value and minimum value of the selected subset of the window (i.e., the summation of maxOf9 and minOf9 is divided by two). An offset value thresholdOffset is then added to this average to determine the binThreshold.

In an embodiment, the thresholdOffset is a value that is pre-programmed and/or chosen based on experience (e.g., such as historical data). The determined threshold binThreshold may include a threshold value that is used for fine adjustment (e.g., an average of a low threshold and a high threshold) and flexibility, as learned in the art. Because the binThreshold is determined based on the minimum and maximum values, which are variable with respect to the values of the pixels in the window, the binThreshold also comprises a variable or adaptive threshold. That is, the determined threshold binThreshold for processing the pixel of interest and its neighboring pixels is variable as the window is moved along the image data.

After the threshold value binThreshold is determined, the pixel of interest and neighboring pixels of the window 200 are then thresholded in step 110 by the processing module using the generated threshold binThreshold. In an embodiment, the following formula is used:

If contone pixel >= binThreshold then set the binary pixel to 1; otherwise 0.

Using such an equation, for example, produces a binary window of data. An example of a binary window is shown by window 300 in FIG. 3, which includes a plurality of on pixels 304 (or pixels with a value of "0") and a plurality of off pixels 302 (or pixels with a value of "1"). For example, in an embodiment, for each of the pixels in the window, the binThreshold may be applied to determine if a pixel value is greater than, equal to, or less than a determined threshold. Pixels that exceed or are equal to a binThreshold are defined as on pixels, and are considered to have a value of "0" with respect to a binary domain. Pixels that are less than a threshold are defined as off pixels, and are considered to have a value of "1" with respect to the binary domain.

In a sense, binary concepts are used to analyze the image data. For example, in a binary image, a pixel is either on or off (i.e., has a value of 0 for black or on pixel; 1 for white or off pixel). In this case, the binThreshold is used to determine if a pixel in the window is on or off, so that the on pixels may be further processed. However, it should be noted that conversion of the image data from contone to binary is not necessary. Rather, the concept of determining if a pixel is included or not included (i.e., yes or no) for further processing is applied during thresholding in step 110.

After applying the threshold binThreshold, the method proceeds to step 112. Step 112 determines characteristics related to the binary pixels provided in the window of binary image data. Specifically, the characteristics that may be determined are related to one or more on runs that may be present in the binary window. A "run" is defined as a succession of pixels of all one color or value. A "run length" is defined as a number of pixels in a run. In this case, an "on run" is defined as a number or sequence of adjacent binary on pixels in a window. As noted above, the value associated with the term "on" should not be limited. In any case, after the thresholds are applied, the number of on pixels (e.g., elements 304 in FIG. 3) is analyzed to determine possible thin line features and related characteristics.

In an example embodiment, each row and column of the binary window 300 is analyzed to determine the characteristics that are related to the on runs. For example, for each row, the number of on runs, their start location(s) and end location(s), and the run length associated with the on run(s) in the window may be counted and/or recorded. A similar calculation may be performed for each column in the window as well. Additionally, the characteristics of pixels (e.g., on runs) may be determined for each row and/or column in relation to the window of image data. Thresholding on runs, as described in step 114 below, may also assist in determining characteristics related to the on runs. For example, characteristics related to on-runs in each row may be compared to characteristics among all of the rows in the window to determine the relationship of the on runs with respect to each other. A comparison such as this may allow for a determination of an orientation of a line, such as an existence of a vertical to 45 degree line in the window. As another example, characteristics associated with each column may be compared among characteristics of all of the columns to determine an existence of a horizontal to 45 degree line. Additionally and/or alternatively, other characteristics related to on runs may include determining variations, locations, and properties (e.g., broken sequence in on runs/lines) in a row and/or column and any associated determinations (i.e., too big, too small, not long enough) or conditions that may be associated with the existence of a thin line in the window of image data. Examples of the characteristic determinations and methods for thresholding the characteristics are described below. Of course, the characteristics of the binary window of image data to be determined should not be limiting.

After determining/calculating the characteristics of the pixels and on runs of the window 300 of binary data, the determined pixel characteristics are thresholded using a set of thresholds at step 114. Generally, such thresholds may be programmable and variable parameters that may be chosen based on experience (e.g., historical data). These thresholds may be based on features that a thin line may have. For example, one may anticipate that a minimum number of pixels and related characteristics are associated with a thin line being present in a window. Alternatively, in an embodiment, it is envisioned that the method (or system) may adapt to the image data that is received. Additionally, thresholding may include using comparisons (such as comparing on runs from row to row or column to column in a window) and anticipated characteristics of lines. Any of these associations or anticipations may be used to assist in choosing the second set of thresholds and should not be limiting.

In an embodiment, the thresholding of step 114 may comprise comparing the number and characteristics of non-zero items (i.e., off or "1" pixels) to the determined characteristics of the on pixels in the binary window. For example, a total number of non-zero items in the rows and columns of the window (e.g., vertical and horizontal) may be determined. In an embodiment, the thresholding of step 114 may include determining that the characteristics of the on runs meet or exceed predetermined requirements or conditions. The thresholding at step 114 allows one to determine if conditions are met to indicate the possible presence or existence of a thin line in the window.

Thus, once the pixels are thresholded, it may be determined if a thin line exists in the window in step 116. Thereafter, step 118 classifies the pixel of interest. Specifically, if it is determined that the thin line exists in step 116, and that the pixel of interest in the window is part of the thin line, the pixel of interest is classified as an edge pixel in step 118. Alternatively, the pixel of interest may be classified as a non-edge pixel if it is determined that a thin line does not exist in step 116, or if it is determined that the pixel of interest is not a part of the thin line. For example, it may be determined that a thin line does not exist in the window if the determined pixel characteristics do not meet a set of thresholds and/or conditions. It may also be determined that the pixel of interest (i.e., center pixel) is not a part of the thin line (e.g., the thin line appears in a different region of the window).

After classifying the pixel of interest in step 118, the processing of the image data may begin again by establishing a new window in step 102.

In some embodiments, the pixel of interest may be classified by a tag. Generally, the application of a tag to a pixel is known in the art. In this case, the tag may be used to aid in developing an edge map of the image data—i.e., map illustrating the pixels that are included in thin lines or edges throughout the image. A tag may indicate that a pixel is an edge pixel or a non-edge pixel. Tags may also only be used to indicate that the pixel is an edge pixel. However, such tagging of the image data need not be provided, and their indications need not be limiting.

Figure 3:
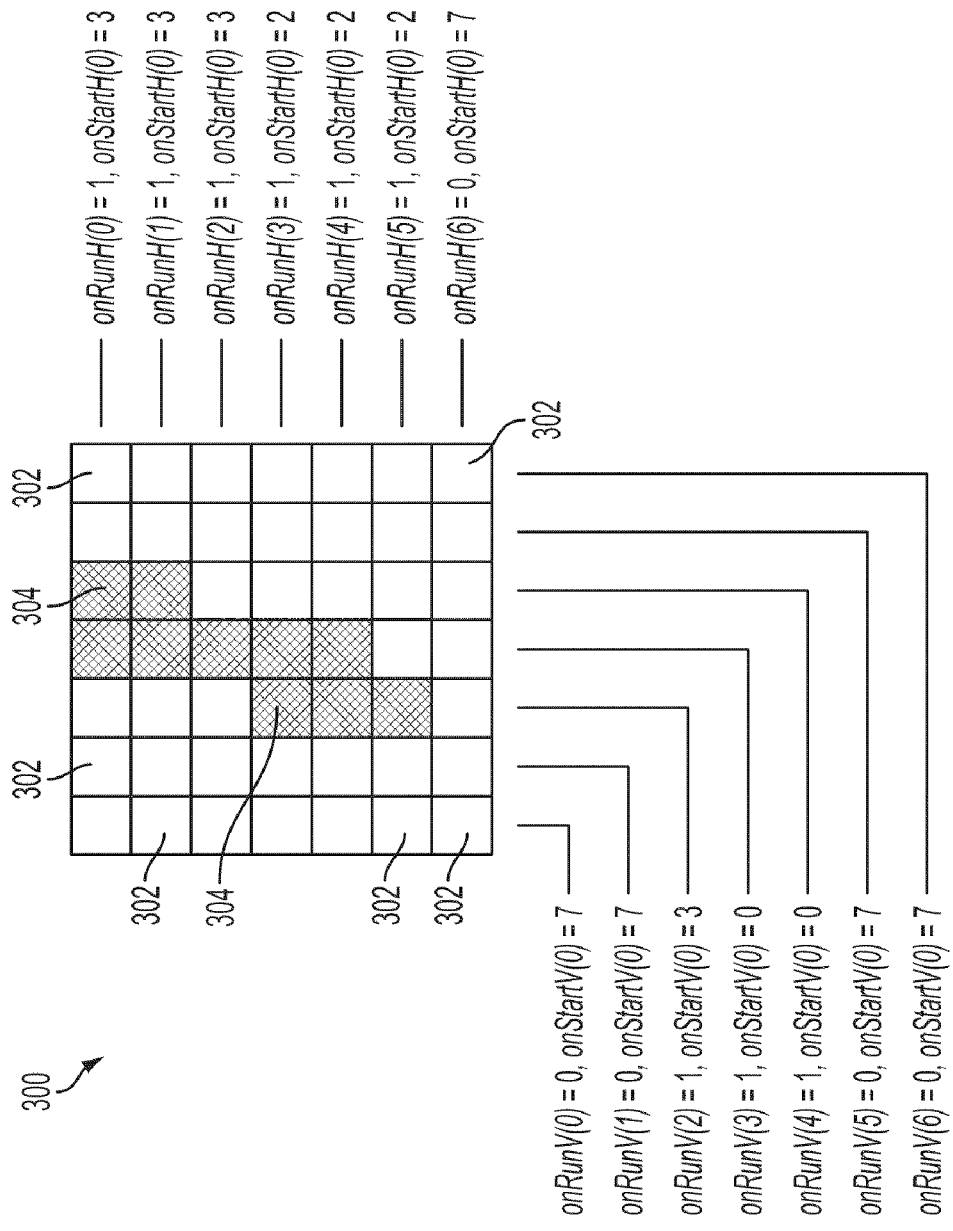
FIG. 3 illustrates an example of a plurality of on-runs of binary data of the window of FIG. 2 for analyzing and processing pixels.
Figure 4:
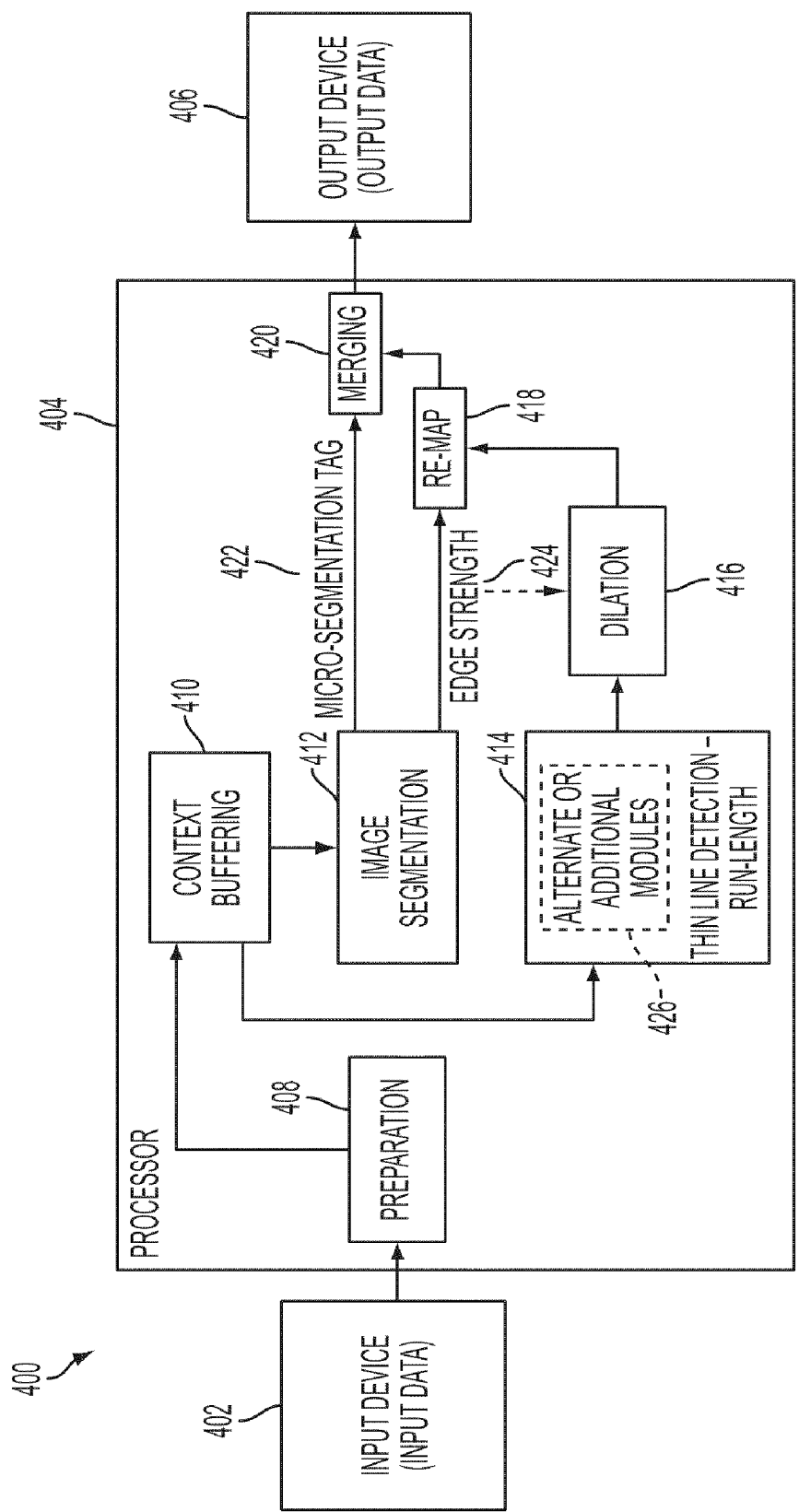
FIG. 4 illustrates an system that may be used to implement the method of FIG. 1 in accordance with an embodiment of the present disclosure.

FIG. 3 illustrates an example of a 7×7 binary window 300 of image data with a plurality of on runs therein provided after thresholding the window 200 of contone image data, such as in step 110 of method 100. As shown, a plurality of on runs of multiple sizes is provided in the window 300. In order to determine the on runs and their characteristics as presented in steps 112 and 114 of the method 100, the processor may first count the number of binary on pixels in each row and column to determine if an on run exists, and, if so, the number of pixels associated with its run length. For example, the following formulas may be used by the processor to determine the on runs:

onRunH(i) records a number on runs in the ith row (horizontal) in the 7×7 window onRunV(j) records a number on runs in the jth column (vertical) in the 7×7 window For example, the 7×7 window may comprise a plurality of horizontal rows labeled rows 0 (zero) to 6 (six), and a plurality of vertical columns labeled 0 (zero) to (6). As shown in FIG. 3, the first row 0 (zero) may have one on run, i.e., onRunH(0)=1. Similarly, the first column 0 (zero) may have no on runs, i.e., onRunV(0)=0. In the example of FIG. 3, either one or none are found. However, it should be noted that two or more on runs may be found per row or per column.

The processor may also determine a start location of each of the on run(s) in each row and column using the following formulas:

onStartH(i) records a start location in the ith row in the 7×7 window from left onStartV(j) records a start location in the jth column in the 7×7 window from top That is, in this example embodiment, from the leftmost portion of the window (e.g., from column 0 (zero), a start location of an on run is determined in a row. As illustrated in FIG. 3, the first row 0 (zero) has one on run that starts at column 3, i.e., onStartH(0)=3. Also, in this embodiment, the start locations of on runs for columns are determined from a topmost portion (e.g., from row 0 (zero)). For example, the first column 0 (zero) may have no on runs. In one implementation, for rows and/or columns with no on runs, the start location may be assigned a value that is outside of the window, i.e., seven (7). As such, referring to the embodiment of FIG. 3, the start value may be set to seven (7), i.e., onStartV (0)=7. For example, the start location/value for the on run may be based on the window size (e.g., window is 7×7, start value for no on runs is 7). As such, this implementation should not be limiting.

Additionally, to determine a run length, an end location of each of the on runs in each row and column may be determined by the processor using the following formulas:

onEndH(i) records an end location in the ith row in the 7×7 window from left onEndV(j) records an end location in the jth column in the 7×7 window from top Again, in this example embodiment, from the leftmost portion of the window (e.g., from column 0 (zero), an end location of an on run is determined in a row. For example, in FIG. 3, the first row 0 (zero) has one on run that end at column 4, i.e., onStartH(0)=4. Also, the end locations of on runs for columns are determined from a topmost portion (e.g., from row 0 (zero)).

Using these values, the processor determines the run length of the on run(s) in each row and column of the window 300. For example, the following formulas may be used:

runLengthH(i) records a run length in the ith row in the 7×7 window runLengthV(j) records a run length in the jth column in the 7×7 window Because multiple on runs may be present in each row and/or column, a plurality of run lengths may be determined (each associated with a run). It should be noted that the determination of the presence of an on run, its start location, and end location, need not be performed in any particular order or the order noted above. That is, the start and end locations of on pixels may be first determined to determine if any on runs exist in the row/column, or, the start location, end location, and the presence of an on run may be determined simultaneously.

In some cases, an on run may include a single pixel. Alternatively, a plurality of pixels (e.g., 2 or more) may form an on run. For any rows and/or columns with no on runs, such as the first and last two columns of window 300, or the last row of window 300, the start location of the on run, i.e., onStartH(i) or onStartV(j) is set to a value of seven (7). Again, this is just one possible implementation and other determinations or values may be used.

Additional characteristics and determinations associated with the on runs may also be calculated. For example, the processor may use the following formulas to determine values associated with the pixels for determining the presence of a line:

If there are 7's in the middle of non-7's then brokenH is set to 1

If 7 is at both ends for the rows, middleH will be set to 1

If there are 7's in the middle of non-7's then brokenV is set to 1

If 7 is at both ends for the columns, middleV will be set to 1

BrokenH is represents a one-bit flag that is used to store intermediate detection results. The brokenH flag is used to indicate an area or 1 or location with no on runs (i.e., start value of 7) in the middle of non-7 rows. For example, the flag brokenH is used to indicate the presence of "empty" rows (i.e., a row with no on runs) in the middle of "non-empty" rows (i.e., rows with on runs). Similarly, the middleH flag is used to indicate a middle location between locations with no one runs (i.e., between rows having a start value of 7). The brokenV flag indicates a broken area or location with no on runs (i.e., start value of 7) in the middle of non-7 columns, and the flag middleV is set to indicate when non-empty columns (i.e., columns with on runs) are present in the middle and empty columns (i.e., columns with no on runs) at two ends (a middle location between locations with no on runs (i.e., between columns having a start value of 7).

After determining/calculating the characteristics of the on run(s) of the window 300, a plurality of thresholds are applied at step 114 to determine if a line exists in step 116. Again, these thresholds are used to compare the on run characteristics to those that a detected thin line may have. For example, the following formulas may be applied by the processor:

(a) From the first i that onStartH(i) is not 7, and for all of the consecutive i's with onStartH(i) not 7,
   if any abs(onStartH(i+1)−onStartH(i)) is greater than startDistThresh, or,
   if any abs(onEndH(i+1)−onEndH(i)) is greater than endDistThresh, or,
   if any abs(runLengthH(i+1)−runLengthH(i)) is greater than runLengthDifThresh
then set the flag distBigH to 1.

(b) From the first j that onStartV(j) is not 7, and for all of the consecutive j's with onStartV(j) not 7,
   if any abs(onStartV(j+1)−onStartV(j)) is greater than startDistThresh, or,
   if any abs(onEndV(j+1)−onEndV(j)) is greater than EndDistThresh, or,
   if any abs(runLengthV(j+1)−runLengthV(j)) is greater than runLengthDifThresh,
then set the flag distBigV to 1.

Wherein:
   startDistThresh is a threshold value that is used for processing the determined on run start location characteristics associated with the pixels in the binary window of image data
   endDistThresh is a threshold value that is used for processing the determined on run end location characteristics associated with the pixels in the binary window of image data
   runLengthDifThresh is a threshold value that is used for processing the determined on run length characteristics associated with the pixels in the binary window of image data
   distBigH is defined as an indication in which locations/run lengths of on runs from row to row are different and/or far apart (in relation to each other)
   distBigV is defined as an indication in which locations/run lengths of on runs from column to column are different and/or far apart (in relation to each other)

Formula (a) applies thresholds to the characteristics associated with the rows of the window. For example, starting at the first row (e.g., topmost) in the window 300, for each row 0 to 6 that does not have a start value of 7 (i.e., for each row that has at least one on run), formula (a) compares the characteristics to a threshold (e.g., start location, end location, and run length of row to a startDistThresh, endDistThresh, and runLengthDifThresh, respectively). More specifically, for formula (a), the absolute value of the difference between the each characteristic value associated with row (i) and the corresponding value associated with row (i+1) is compared to the thresholds. It is determined if there is an indication in which locations/run lengths of on runs from row to row are different and/or far apart (in relation to each other). If the absolute value of the difference between the characteristics is greater than the associated threshold, then the flag distBigH is set to 1. That is, distBigH flags cases in which start locations of on runs from row to row are far apart, or in which end locations of on runs from row to row are far apart, or in which the run length of on runs from row to row are different. Such flags may indicate, for example, that a vertical line may not be present in the window.

Formula (b) applies thresholds to the characteristics associated with the columns of the window. For example, starting at the first column (e.g., leftmost) in the window 300, for each column 0 to 6 that does not have a start value of 7 (i.e., for each row that has at least one on run), formula (b) compares the characteristics to a threshold (e.g., start location, end location, and run length of column to a startDistThresh, endDistThresh, and runLengthDifThresh, respectively). More specifically, for formula (b), the absolute value of the difference between the each characteristic value associated with column (j) and the corresponding value associated with column (j+1) is compared to the thresholds. It is determined if there is an indication in which locations/run lengths of on runs from column to column are different and/or far apart (in relation to each other). If the absolute value of the difference between the characteristics is greater than the associated threshold, then the flag distBigV is set to 1. Similarly as noted above with respect to the rows/distBigH, distBigV flags cases in which start locations of on runs from column to column are far apart, or in which end locations of on runs from column to column are far apart or in which the run length of on runs from column to column are different. Such flags may indicate, for example, that a horizontal line may not be present in the window.

The number of non-zero items or pixels 302 in window 300 may also or alternatively be used in step 114 to threshold the characteristics of the window 300 and its on run(s). That is, in addition to determining on pixels (e.g., pixels with a value of "0"), a total number of off pixels (or non-zero items with a value of "1") in the window may be determined. For example, the processor may use the following formula to record the total number of off items in all of the rows of the window:

$$\text{off}H = \Sigma(\text{onRun}H(i) \neq 0) \text{ OR } \text{off}H = \Sigma(\text{onRun}H(i)! = 0)$$

With the above formula, the sum of the rows (horizontal direction) having at least one on run is determined. More specifically, onRunH(i) records the number of on runs in the ith row. The evaluation in the above formulas determine if either on runs are present (yes, or a count of 1 for the row) or not present (no, or a count of 0 for the row). For each row having one or more on runs, the row is counted as 1. OffH records the sum of these counts, i.e., the sum of the number of rows that have one or more on runs. The formula does not sum the number of on runs in each row together, but, rather, how many rows have on runs in them. For example, if a row has three (3) on runs, it contributes (adds) a count of one to offH.

The processor may also use the following formula to record the total number of off items in the columns of the window:

offV=Σ(onRunV(j)≠0)OR offV=Σ(onRunV(j)!=0)

With the above formula, the sum of the zero runs in each column (vertical direction) having at least one on run is determined. More specifically, onRunV(j) records the number of on runs in the jth column. The evaluation in the above formulas determine if either on runs are present (yes, or a count of 1 for the column) or not present (no, or a count of 0 for the column). For each column having one or more on runs, the column is counted as 1. OffV records the sum of these counts, i.e., the sum of the number of columns that have one or more on runs. The formula does not sum the number of on runs in each column together, but, rather, how many columns have on runs in them. For example, if a column has two (2) on runs, it contributes (adds) a count of one to offV.

These totals offH and offV may be used or thresholded to calculate or detect a presence of the thin line in a window. For example, the processor may be used to determine if the following condition is satisfied:

(3) If either of these conditions are met, a thin line may exist in the window:
Condition Set A
offH>offThresh
ΣonRunH(i)−offH<=onRunDif
distBigH=0
brokenH=0
brokenV=0
middleH=0
The number of off (or "1") pixels>=marginWhiteThresh for both the 1$^{st}$ column and the last column in the binarized 7×7 window
Condition Set B
offV>offThresh
ΣonRunV(j)−offV<=onRunDif
distBigV=0
brokenH=0
brokenV=0
middleV=0
The number of off (or "1") pixels>=marginWhiteThresh for both the 1st row and the last row in the binarized 7×7 window
Wherein:
offThresh is a threshold value for processing the sum of off (or non-zero) pixels in the binary window, and is used to ensure a long enough line segment
onRunDif is a threshold value for processing the on and off pixels in the binary window
marginWhiteThresh is a threshold value for processing the pixels in the window against a margin threshold More specifically, if either all conditions in set A are met or if all conditions in set B are met, a thin line may exist. Condition set A is associated with the determined row characteristics, and is used to determine if vertical to 45 degree lines are present. Condition set B is associated with the determined column characteristics, and is used to determine if horizontal to 45 degree lines are present. If the characteristics of either the rows or columns are met, a decision may be made. For example, referring to condition A, the total number of off pixels offH must be greater than a threshold for consideration of the existence of a line. Also, for example, the difference between the total number of on runs and the total number of off items must be less than or equal to a difference threshold value onRunDif to indicate the possible existence of a thin line.

Also, it should be noted that these thresholds-offThresh, onRunDif, and marginWhiteThresh may be programmable and variable parameters. For example, the values of such parameters may be chosen based on experience (e.g., historical data) or based on the values that are present in the window. In some cases, however, the thresholds may be adaptable or variable.

Generally, if condition A or condition B of condition (3) is satisfied, it is determined in step 116 that a line is found in the window. If neither condition A nor condition B of condition (3) are met, then it is determined in step 116 that a line does not exist in the window. Thereafter, as noted above, the pixel of interest may then be classified as an edge pixel in step 118 if it is determined that the thin line exists (condition (3)). If condition (3) or (4) is met, the pixel of interest is classified as a non-edge pixel in step 118.

The method as described in FIG. 1 is used for all of the image data, i.e., as a sliding window, for the determination of thin lines throughout. This method may be used in combination with existing image segmentation algorithms to further define an output image, for example. Generally, this method provides a cost effective thin line detection algorithm that addresses the short comings of the known image segmentation methods. By combining features extracted from the con-tone domain and the binary domain to make the thin line detection decision, a better quality image is produced.

Figure 5:
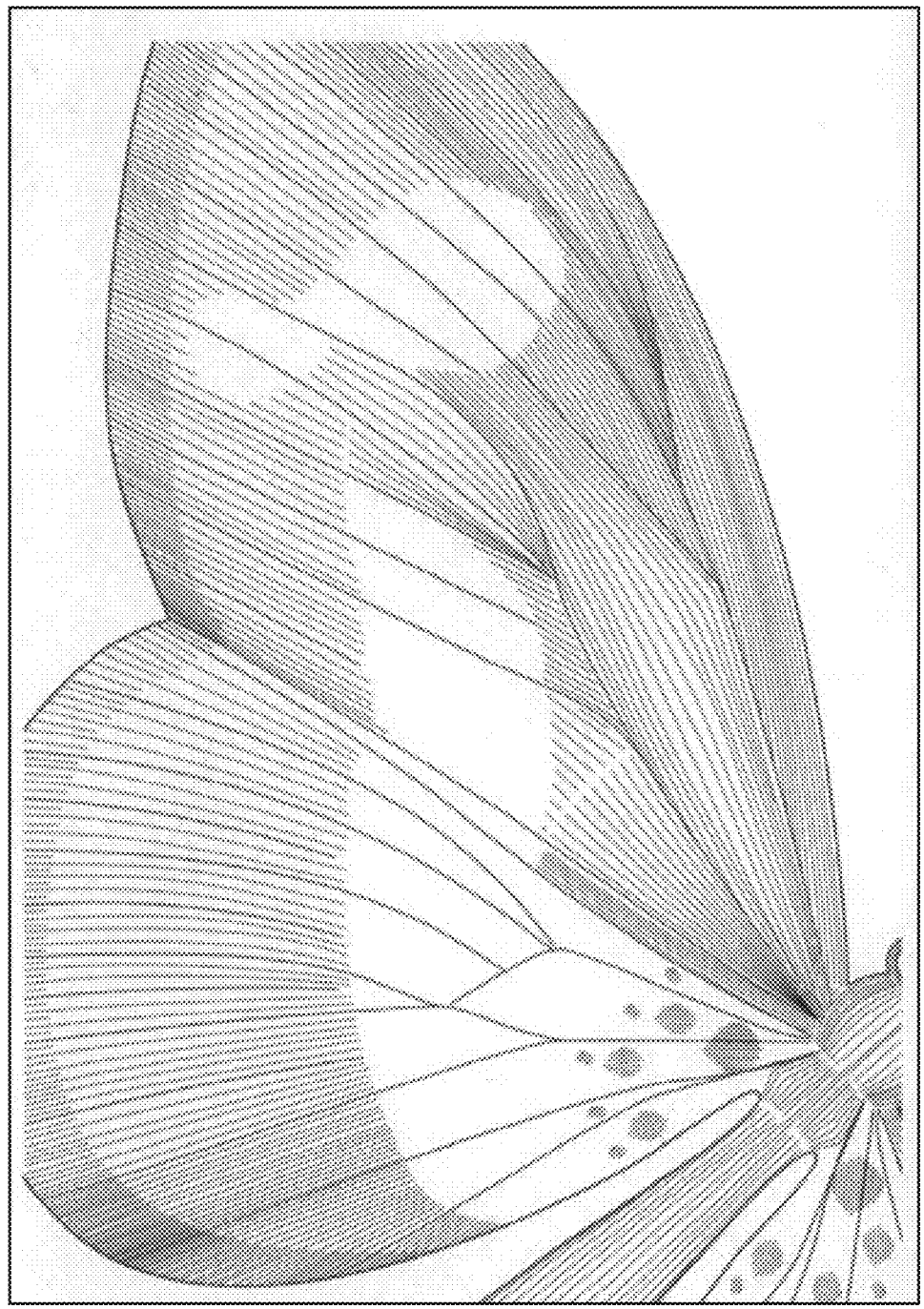
FIG. 5 shows an example of an input image that may be input for processing in accordance with an embodiment of the present disclosure.
Figure 7:
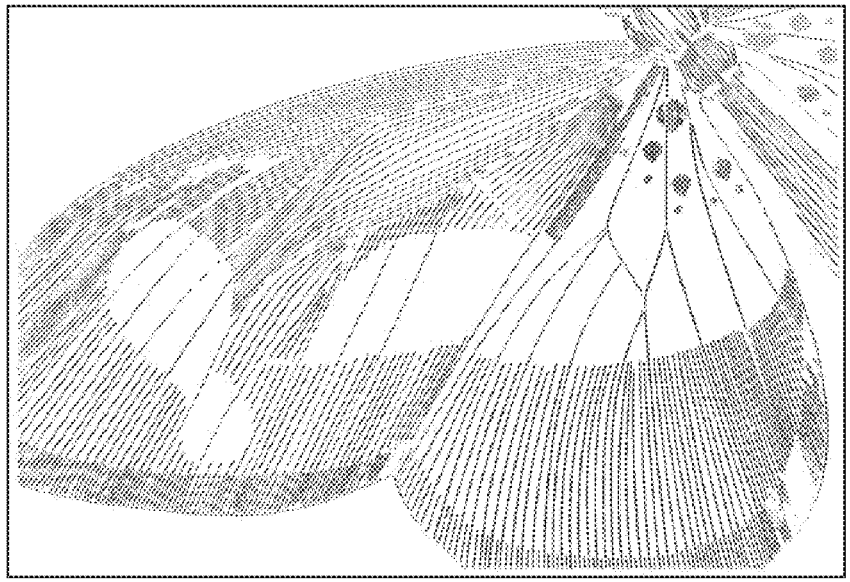
FIG. 7 illustrates an example of an edge map that may be generated after processing the input image of FIG. 5 using the method of FIG. 1.
Figure 6:
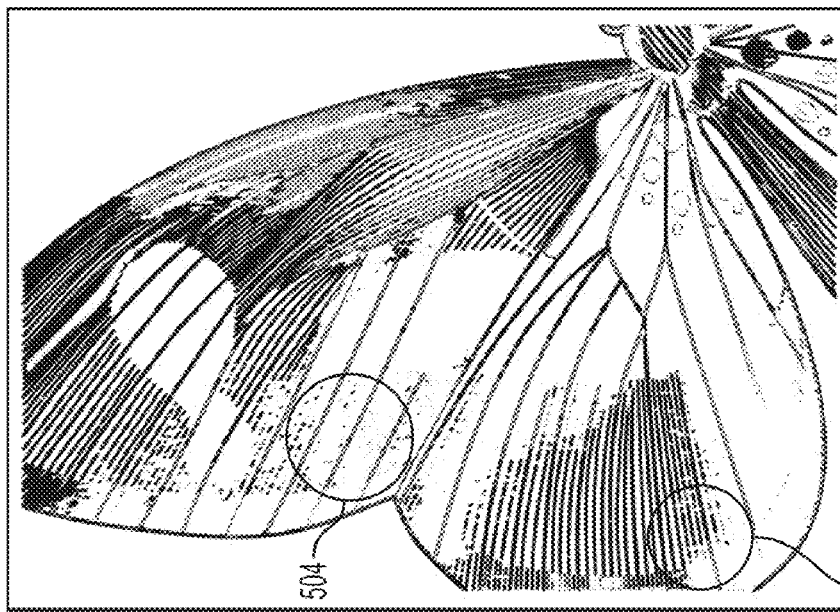
FIG. 6 illustrates an example of an edge map that may be generated after processing the input image of FIG. 5 using existing or prior segmentation methods.

Specifically, the algorithm or method has been proven effective in improving robustness of thin line detection over existing image segmentation methods. For example, the method 100 can detect thin lines missed by existing segmentation modules. FIG. 5 shows an example of an input image 500 that may be received. Using some existing segmentation algorithms, an edge map such as 502 may be generated. As shown by sections 504, 506 in FIG. 6, the edge map 502 may have degraded or missing pixels for some of the thin lines that are present in the original image 500. FIG. 6 illustrates how existing segmentation algorithms may detect pixels in halftone area as edge pixels, but on the other hand miss many true edge pixels in thin line region. Using the proposed method, the resultant edge and thin line detection is significantly improved, as illustrated by the image edge map (also called an segmentation tag map) in FIG. 7.

Figure 8:
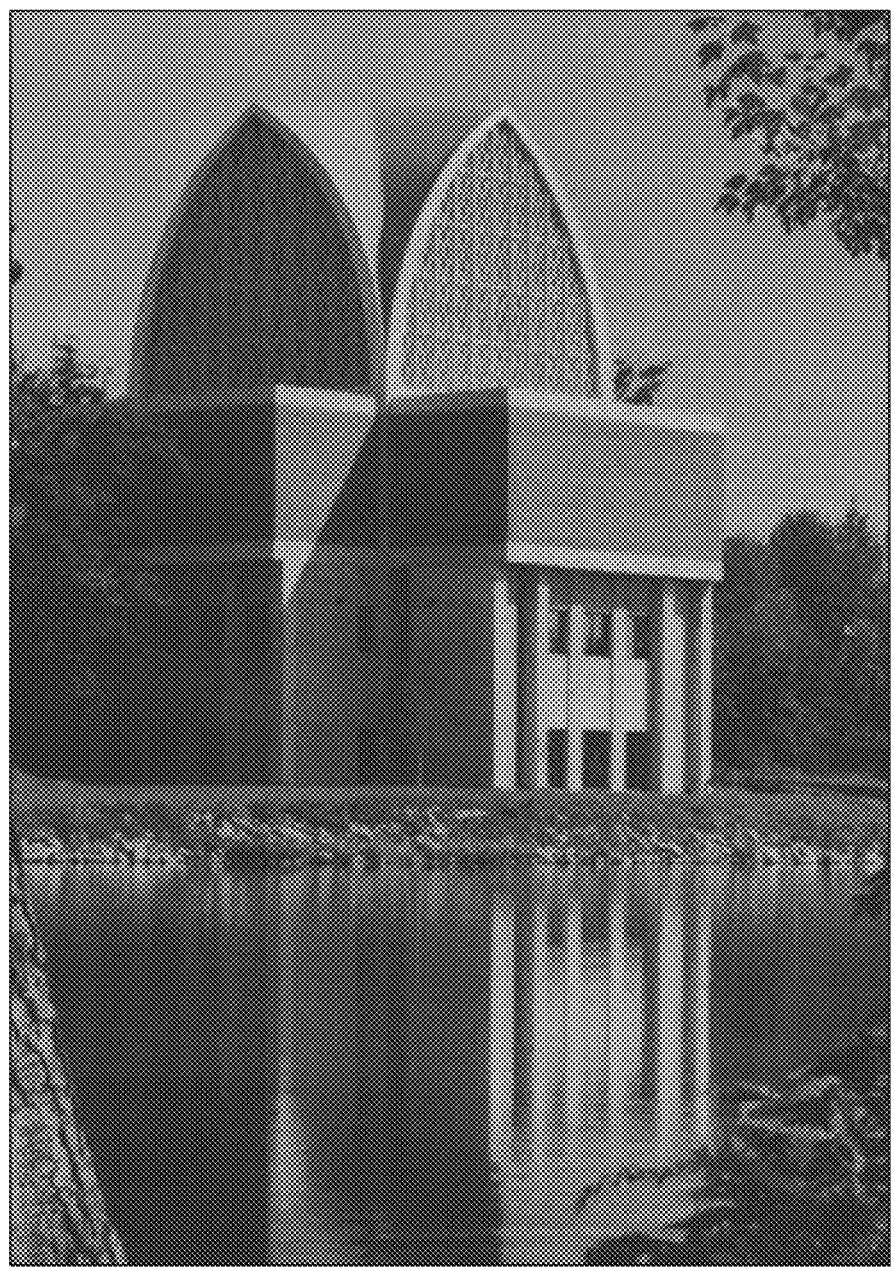
FIG. 8 shows an example of an input image that may be input for processing in accordance with an embodiment of the present disclosure.
Figure 10:
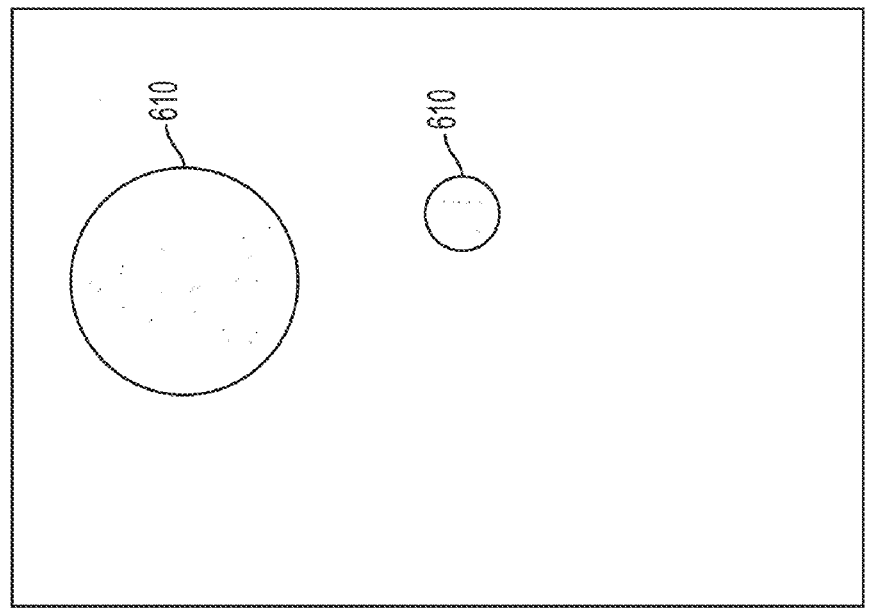
FIG. 10 illustrates an example of an edge map that may be generated after processing the input image of FIG. 8 using the method of FIG. 1.
Figure 9:
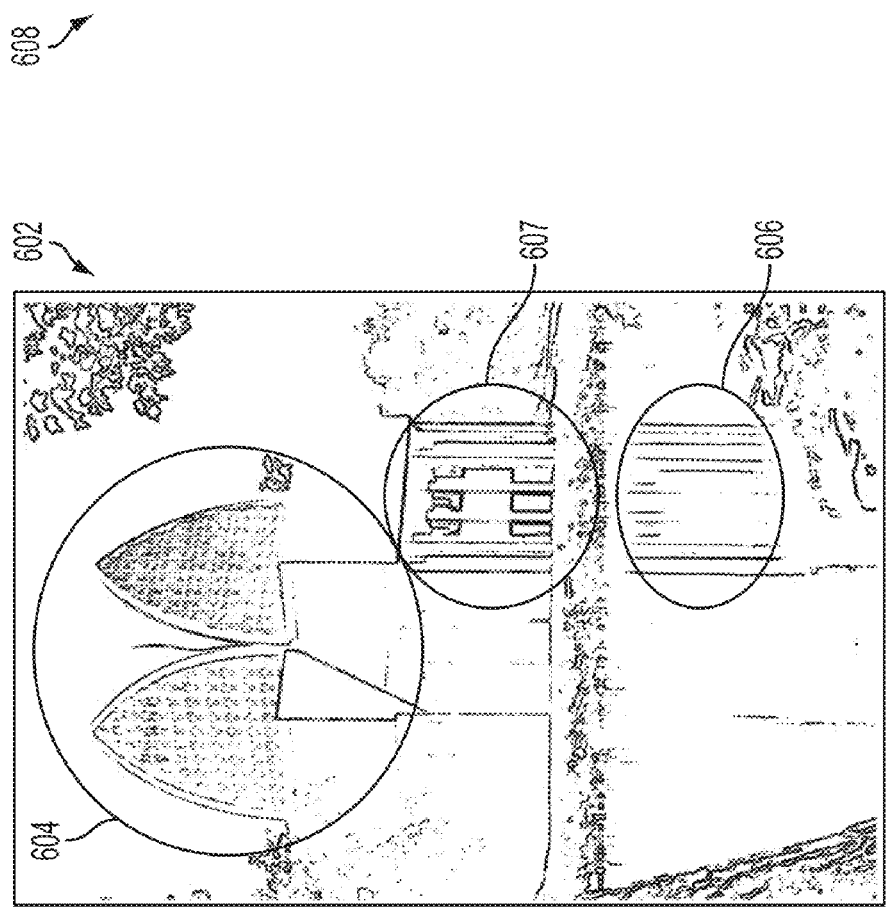
FIG. 9 illustrates an example of an edge map that may be generated after processing the input image of FIG. 8 using existing or prior segmentation methods.

Additionally, the noted algorithm or method 100 also allows for a less aggressive approach to edge detection, thus avoiding false alarms (e.g., adding a line where a line is not present). Such false alarms may be particularly noticeable when processing halftone image data, for example. FIG. 8 shows another example of an input image 600. Using some existing segmentation algorithms, an edge map such as 602 may be generated. As shown by sections 604, 606, and 607 in FIG. 9, the edge map 602 may have determined the presence of thin lines in the image data that are not present in the original image 600. In particular, FIG. 9 shows how existing segmentation algorithms may detect pixels in halftone area as edge pixels, indicating thin lines, when lines are not present. Using the proposed method, the resultant edge and thin line detection is significantly improved, and false thin lines are not output, as illustrated by the image edge map 608 in FIG. 10. For example, with the disclosed method, the edge map 608 of FIG. 10 identifies pixels 610 associated with a thin line, but false lines are not inserted.

FIG. 4 illustrates an example system 400, in accordance with an embodiment, that may be used to implement the proposed method and/or algorithm of FIG. 1. It is to be understood that the image segmentation system 400 and method 100 as described herein may be implemented or processed using a number of devices, including a processor, computer, microprocessor, microcontroller, circuit elements, logic circuits or devices, as well as combinations of software and hardware, and should not be limited to those described herein. The system 400 may be, for example, a system for scanning, printing, faxing, copying, etc. or a system for combining such multiple functions, and should not be limiting.

As shown, the system 400 generally comprises an input device 402, a processing device or module 404, and an output device 406. System 400 may be an apparatus or device and/or can be a xerographic system, a photocopier, or printing device. The input device 402 may comprise an image input terminal (IIT) that is used to acquire or receive image data. For example, in some embodiments, the input device 402 may comprise a digital scanner or some other device for capturing image data. For example, image data may be capturing by a scanner in a copier, facsimile machine, a multi-function device (MFD), a camera, a video camera, or any other know or later device that is capable of scanning and/or capturing electronic image data. It should also be understood to one of ordinary skill in the art that image data may be received as input via Internet Protocol (IP), server, electronic communication (e.g., e-mail) or some other method or device, and/or that input device may be connected to a network, and that methods for receiving such data should not be limiting.

After input data or image data is received via an input device 402, the data is processed using the processing module 404. The processing module 404 may comprise a plurality of modules for processing the data for storage and/or output, for example. Though a plurality of modules for processing the data are shown and described, it should be noted that the types of modules and processes performed thereon should not be limited to those provided. For example, more or less devices may be used to perform the processing functions. The processing operations may be carried out by hardware (e.g., FPGA or ASIC) or software components. For example, it should be noted that the system 400 may comprise one or more processors, and should not be limited. The one or more processors such as processing module 404 is capable of executing machine executable program instructions. In an embodiment, the processor is in communication with a bus (not shown). The system 400 may also include memory (not shown) that is used to store machine readable instructions to be executed by the processing module 404. The memory is capable of storing data used by or produced by the processing module 404. The type of memory should not be limiting; for example, the memory may alternatively include random access memory (RAM).

In the embodiment of FIG. 4, the image data sent from the input device 402 to a preparation module 408 of the processing module 404. Preparation module 408 may include performing functions on the input data such as noise reduction and pixel level mapping, for example. The data may then be processed by a context buffering module 410. Preparation module 408 and context buffering module 410 work in combination with an image segmentation module 412 as well. The image segmentation module 412 is used to classify pixels of the input image data into classes such as continuous tone (contone) of different levels or smoothness, halftones of different frequency, edge, background, etc. and may provided the classified data with micro-segmentation tags, as represented by element 422. Such a module may be an existing module or a module for performing such processes as is known in the art. Some image segmentation modules also compute and export features such as edge strength, as represented by element 424. In some cases, the image segmentation module 412 may include one or image segmentation modules for performing existing processes or techniques on the image data. Of course, it should be noted that image segmentation module 412 need not be used, nor present in the system 400. The image segmentation module 412 may apply known methods to image data as well, so that the combination of results produces a better quality output image.

In this case, the image segmentation module 412 is used in combination with a run-length thin line detection module 414 to offer much improved results over existing segmentation modules. The run-length thin line detection module 414 performs the method described above in FIG. 1 for determining thin lines in the image data. For example, the run-length thin line detection module 414 is provided to establish a window and detect the minimum and maximum values, thresholds, and determining characteristics of the binary image data (e.g., location, size, and number of binary on pixels or on-runs) to determine if a thin line exists in the input data.

In some embodiments, additional or separate modules for performing the steps of the method may be provided in conjunction with or as a part of the thin line detection module. For example, in some cases, a min-max module, threshold module, and/or classification module, represented by element 426, may be a part of the thin line detection module 414.

The results or output from the run-length thin line detection module 414 may be optionally dilated by a dilation module 416, as is generally known in the art. That is, the dilation module 416 may perform an efficient one-dimensional (1-D) dilation routine that is added to grow an edge map (e.g., in a fast scan process) which may improve the performance of image data enhancement routines. In some embodiments, if memory constraints are not limited, dilation can be performed in a slowscan direction, as well via a dilation kernel of any size.

Thereafter, the thin line detection results can be re-mapped using a re-mapping module 418. In some cases, the re-mapping may be based on an edge strength 424 that is reported by the image segmentation module 412. For example, the combination can be a simple 2-bit in/1-bit out look-up table. Alternatively, the edge strength 424 determined by the image segmentation module 412 may be used to control the dilation of the image data by the dilation module 416 and a combination of the thin line detection results. The thin line detection results may then be merged with the segmentation tag stream using a merging module 420. In some cases, a simple look-up table, as known in the art, may be used to provide flexibility in merging the documents. The processed image data may then be output to an output device 406 such as a printer. The word "printer" encompasses any apparatus, such as a digital copier, bookmaking machine, facsimile machine, multi-function machine, etc. which performs a print outputting function for any purpose.

Other embodiments include incorporating the above steps into a computer program product comprising a computer-usable data carrier storing instructions that, when read and executed by a computer, cause the computer to perform a method 100 in an automated fashion. The instructions may be stored on a data carrier or otherwise a computer readable medium. For example, the method of FIG. 1 may be a chart of such computer readable instructions. For example, in some embodiments, memory or storage of a system 400 carrying computer readable instructions is configured such that when the computer readable instructions are executed by a computer or processing module 404, they cause a computer to automatically perform a method for detecting thin lines in image data.

According to an embodiment of the disclosure, the processing of image data is provided by system 400 in response to processing module 404 executing one or more sequences of one or more instructions contained in a memory (not shown). Such instructions may be read into the memory from another computer-readable medium, such as a storage device (which may or may not be a part of the memory). Execution of the sequences of instructions contained in the memory causes processing module 404 to perform the process steps of method 100 described herein. One or more processors in a multi-processing arrangement may also be employed to execute the sequences of instructions contained in the memory of the system 400. However, the embodiments of this disclosure are not limited to any specific combination of hardware and/or software.

The term "computer program product" as used herein refers to any product or medium that participates in providing instructions to processing module 404 for execution. Such a product may take many forms, including but not limited to, non-volatile media, volatile media, and transmission media. Common forms of computer program products or readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other product from which a computer can read. Also, various forms of computer products or media may be involved in carrying one or more sequences of one or more instructions to processing module 404 for execution, and should not be limiting.

While the principles of the disclosure have been made clear in the illustrative embodiments set forth above, it will be apparent to those skilled iii the art that various modifications may be made to the structure, arrangement, proportion, elements, materials, and components used in the practice of this disclosure. For example, it is to be understood that in some embodiments, the run-length thin line detection module 414 may be a module that is added to supplement an existing processing system or processor 404. Also, the claims can encompass embodiments in hardware, software, or a combination thereof.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting thin lines in image data, the method comprising:
    receiving contone image data via an input device, the image data comprising a plurality of pixels;
    using a processor to process the image data and determine the presence of thin lines, wherein each determined thin line comprises at most four pixels along its width, the processing including:
    establishing a window comprising a pixel of interest and neighboring pixels;
    determining a minimum value and a maximum value in a selected subset of pixels in the window;
    thresholding the pixel of interest and neighboring pixels of the window using thresholds;
    converting the pixels in the window, after thresholding, into a binary window of image data comprising a plurality of binary pixels, the binary pixels including a number of on and off pixels;
    determining characteristics associated with the on pixels in each row and column of the binary window;
    thresholding the characteristics associated with the on pixels and off pixels of the binary window;
    determining if a thin line exists in the window based on the thresholding of the characteristics associated with the on pixels and off pixels; and
    classifying the pixel of interest as an edge pixel that is part of a thin line if it is determined that the thin line exists.

2. The method according to claim 1, wherein the method further includes:
    tagging the pixel of interest as an edge pixel.

3. The method according to claim 1, wherein the method further includes:
    tagging the pixel of interest as a non-edge pixel if it is determined that a thin line does not exist or that the pixel of interest is not a part of the thin line.

4. The method according to claim 1, wherein the processing includes determining the thresholds for processing the pixel of interest and neighboring pixels in the window based on the minimum and maximum values.

5. The method according to claim 1, wherein the characteristics associated with the on pixels include a start location, an end location, and a length of a sequence of on pixels in a row or a column in the binary window.

6. The method according to claim 1, wherein characteristics associated with the on pixels include variations in on runs in a row or column and locations of on runs in a row or column.

7. The method according to claim 6, wherein the variations or locations indicate a broken sequence in a row or column in the binary window.

8. The method according to claim 1, wherein the thresholding the characteristics assists in determining an orientation of a line in the binary window.

9. The method according to claim 1, wherein the thresholding the characteristics includes comparing characteristics associated with the on pixels in each row and/or column with characteristics among all of the rows and/or columns in the binary window.

10. The method according to claim 1, wherein the thresholding the characteristics includes comparing characteristics associated with the off pixels to the characteristics associated with the on pixels of the binary window.

11. The method according to claim 1, further comprising:
    outputting the image data via an output device.

12. A system for detecting thin lines in image data, the system comprising:
    an input device for receiving contone image data, the image data comprising a plurality of pixels;
    a processor configured to process the image data and determine the presence of thin lines, wherein each determined thin line comprises at most four pixels along its width;
    the processor comprising a thin-line detection module comprising code executable by the processor for performing a method comprising:
    establishing a window comprising a pixel of interest and neighboring pixels;
    determining a minimum value and a maximum value in a selected subset of pixels in the window;
    thresholding the pixel of interest and neighboring pixels of the window using thresholds;
    converting the pixels in the window, after thresholding, into a binary window of image data comprising a plurality of binary pixels, the binary pixels including a number of on and off pixels;

determining characteristics associated with the on pixels in each row and column of the binary window;

thresholding the characteristics associated with the on pixels and off pixels of the binary window;

determining if a thin line exists in the window based on the thresholding of the characteristics associated with the on pixels and off pixels; and classifying the pixel of interest as an edge pixel that is part of a thin line if it is determined that the thin line exists.

13. The system according to claim 12, wherein the thin-line detection module comprises code executable by the processor that is configured to determine a start location, an end location, and a length of a sequence of on pixels in a row or a column in the binary window.

14. The system according to claim 12, wherein the thin-line detection module comprises code executable by the processor that is configured to determine a broken sequence in a row or column in the binary window.

15. The system according to claim 12, wherein the thin-line detection module comprises code executable by the processor that is configured to determine an orientation of a line in the binary window.

16. The system according to claim 12, wherein the thin-line detection module comprises code executable by the processor that is configured to compare characteristics associated with the on pixels in each row and/or column with characteristics among all of the rows and/or columns in the binary window.

17. The system according to claim 12, further comprising: an output device for outputting the image data.

18. A non-transitory computer-readable medium storing instructions that, when executed by a computer, cause the computer to perform a method comprising:

establishing a window comprising a pixel of interest and neighboring pixels;

determining a minimum value and a maximum value in a selected subset of pixels in the window;

thresholding the pixel of interest and neighboring pixels of the window using thresholds;

converting the pixels in the window, after thresholding, into a binary window of image data comprising a plurality of binary pixels, the binary pixels including a number of on and off pixels;

determining characteristics associated with the on pixels in each row and column of the binary window;

thresholding the characteristics associated with the on pixels and off pixels of the binary window;

determining if a thin line exists in the window based on the thresholding of the characteristics associated with the on pixels and off pixels; and classifying the pixel of interest as an edge pixel that is part of a thin line if it is determined that the thin line exists.

19. The non-transitory computer-readable medium according to claim 18, wherein the method performed by the computer further includes determining the thresholds for processing the pixel of interest and neighboring pixels in the window based on the minimum and maximum values.

20. The non-transitory computer-readable medium according to claim 18, wherein the method performed by the computer further includes determining a start location, an end location, and a length of a sequence of on pixels in a row or a column in the binary window.

21. The non-transitory computer-readable medium according to claim 18, wherein the method performed by the computer further includes determining a broken sequence in a row or column in the binary window.

22. The non-transitory computer-readable medium according to claim 18, wherein the method performed by the computer further includes determining an orientation of a line in the binary window.

23. The non-transitory computer-readable medium according to claim 18, wherein the method performed by the computer further includes comparing characteristics associated with the on pixels in each row and/or column with characteristics among all of the rows and/or columns in the binary window.

* * * * *